(12) United States Patent
Kim et al.

(10) Patent No.: US 6,390,334 B1
(45) Date of Patent: May 21, 2002

(54) ICE CREAM VENDING MACHINE

(75) Inventors: Sung-jung Kim; Man-seob Lee, both of Kwangju (KR)

(73) Assignee: Samsung Kwangju Electronics Co., Ltd., Kwangju (KR)

( * ) Notice: Subject to any disclaimer, the term of this patent is extended or adjusted under 35 U.S.C. 154(b) by 0 days.

(21) Appl. No.: 09/964,968

(22) Filed: Sep. 27, 2001

(30) Foreign Application Priority Data

| Oct. 9, 2000 | (KR) | 00-59357 |
| Feb. 19, 2001 | (KR) | 01-8271 |
| Jul. 5, 2001 | (KR) | 01-39923 |

(51) Int. Cl.[7] ............................................... B67D 5/62
(52) U.S. Cl. ................................ 222/146.6; 222/185.1; 222/413
(58) Field of Search ........................... 222/146.6, 185.1, 222/413

(56) References Cited

U.S. PATENT DOCUMENTS

| 5,086,951 A | * | 2/1992 | Nakayama et al. | 222/146.6 |
| 5,893,485 A | * | 4/1999 | McGill | 222/146.6 |
| 6,186,373 B1 | * | 2/2001 | Johanson | 222/413 |
| 6,199,724 B1 | * | 3/2001 | Yeranossian | 222/185.1 |
| 6,264,066 B1 | * | 7/2001 | Vincent et al. | 222/146.6 |

* cited by examiner

*Primary Examiner*—Joseph A. Kaufman
(74) *Attorney, Agent, or Firm*—Ladas & Parry

(57) ABSTRACT

An ice cream vending machine serves a customer with ice cream maintained in an optimum state by preventing supply of ice cream at a greater temperature. The ice cream vending machine includes a cooling system, a freezing chamber cooled by the cooling system, a canister arranged within the freezing chamber for holding a bead type ice cream, a cup supplying device arranged outside of the freezing chamber, for supplying a cup for holding the bead type ice cream, an ice cream discharging device for discharging the bead type ice cream from the canister, and a conveyor for conveying the cup supplied by the cup supplying device, the cup being conveyed between a location to where the cup is supplied by the cup supporting device to a location where the ice cream is discharged from the freezing chamber. The cup-conveyor may convey the cup either along a horizontal plane or in both a horizontal and a vertical direction. The cup-conveyor may also sealingly close off the ice cream outlet when the vending machine is not in vending operation.

4 Claims, 12 Drawing Sheets

ICE CREAM VENDING MACHINE

REFERENCE TO RELATED APPLICATION

This application is related to U.S. patent application Ser. No. 09/946,297, filed on Sep. 4, 2001, the disclosure of which is incorporated by reference herein.

BACKGROUND OF THE INVENTION

1. Field of the Invention

The present invention relates generally to an ice cream vending machine, and more particularly to an ice cream vending machine for unattended vending of bead type ice cream which is frozen in the form of granules that are 3mm–7mm in diameter.

2. Description of the Related Art

FIG. 1 shows an ice cream vending machine. The vending machine shown in FIG. 1 is a recent development of the assignee of the present application, has not been publicly disclosed and has not been previously disclosed to anyone not associated with the assignee. Accordingly, the device shown in FIG. 1 does not qualify as prior art and cannot be used as a reference against patentability of the present invention.

As shown in FIG. 1, the ice cream vending machine includes a cooling system 10, a freezing chamber 20, a canister 30, a cup-supplying device 40, an ice cream discharging device 50, a chute 60, and a guide member 70.

The cooling system 10 is substantially identical to a general refrigeration cycle. Once cooled by the cooling system 10, the air is blown into the freezing chamber 20 by a blower 11. A canister 30 is arranged inside of the freezing chamber 20.

The canister 30 is normally filled with a bead type ice cream that is frozen into a shape having a granule size of between 3–7mm in diameter. The freezing chamber 20 is maintained at a temperature approximately from –43° C. to –27° C.

The cup-supplying device 40 is arranged outside of the freezing chamber 20, to supply cups 41 for holding ice cream. The ice cream discharging device 50 is provided adjacent to the lower portion of the canister 30. The cup-supplying device 40 and the ice cream discharging device 50 are substantially identical to known ice cream vending machines.

The chute 60, arranged on the lower side of a discharging port 51 of the ice cream discharging device 50, directs the discharged ice cream into a certain path. Also, the guide member 70 is arranged on the lower side of the chute 60 to guide the discharge ice cream into the cup 41 supplied by the cup-supplying device 40.

In conventional ice cream vending machines, first a customer inputs a coin of a predetermined amount into the vending machine and then presses a selection button. The cup supplying device 40 then supplies the cup 41 to a predetermined location underneath a discharge port of the guide member 70.

Next, the ice cream discharging device 50 is operated so that the ice cream is discharged. The discharged ice cream is discharged into the cup 41 through the chute 60 and a passage 71 of the guide member 70. Subsequently, the customer pulls out the cup 41 and enjoys the ice cream.

In such ice cream vending machines, however, the ice cream is guided at a normal temperature by the guide member 70 from an ice cream outlet of canister 30 to the location where the cup 41 is supplied.

As it passes through the passage 71 of the guide member 70, the ice cream partially melts, and accordingly, the ice cream cannot be served at an optimum state. Additionally, residual ice cream remains in the passage 71 of the guide member 70. The remaining ice cream in the passage 71 goes bad as time passes, and accordingly, a machine operator has to bear the inconvenience of frequently having to clean the vending machine.

SUMMARY OF THE INVENTION

The present invention has been made to overcome the above-mentioned problems of the conventional ice cream vending machines, and accordingly, it is an object of the present invention to provide an ice cream vending machine that provides a customer with an ice cream in an optimum state by preventing conveyance of the ice cream at normal or room temperature, and also provides a machine operator of the vending machine convenience in maintenance.

The above object is accomplished by an ice cream vending machine in accordance with the present invention, including a cooling system, a freezing chamber cooled by the cooling system, a canister arranged within the freezing chamber, for holding a bead type ice cream, a cup supplying device arranged outside of the freezing chamber, for supplying a cup for holding the bead type ice cream, an ice cream discharging device for discharging the bead type ice cream from the canister, and a conveying means for conveying the cup supplied by the cup supplying device, the cup being conveyed between a location (first location) to where the cup is supplied by the cup supporting device to a location (third location) to where the ice cream is discharged from the freezing chamber.

BRIEF DESCRIPTION OF THE DRAWINGS

The above-mentioned objects and the features of the present invention will be more apparent by referring to the preferred embodiments of the present invention described in detail in reference to the appended drawings, in which.

DETAILED DESCRIPTION OF PREFERRED EMBODIMENTS

The preferred embodiments of the present invention will now be described in detail with reference to the accompanying drawings.

Figure 1:
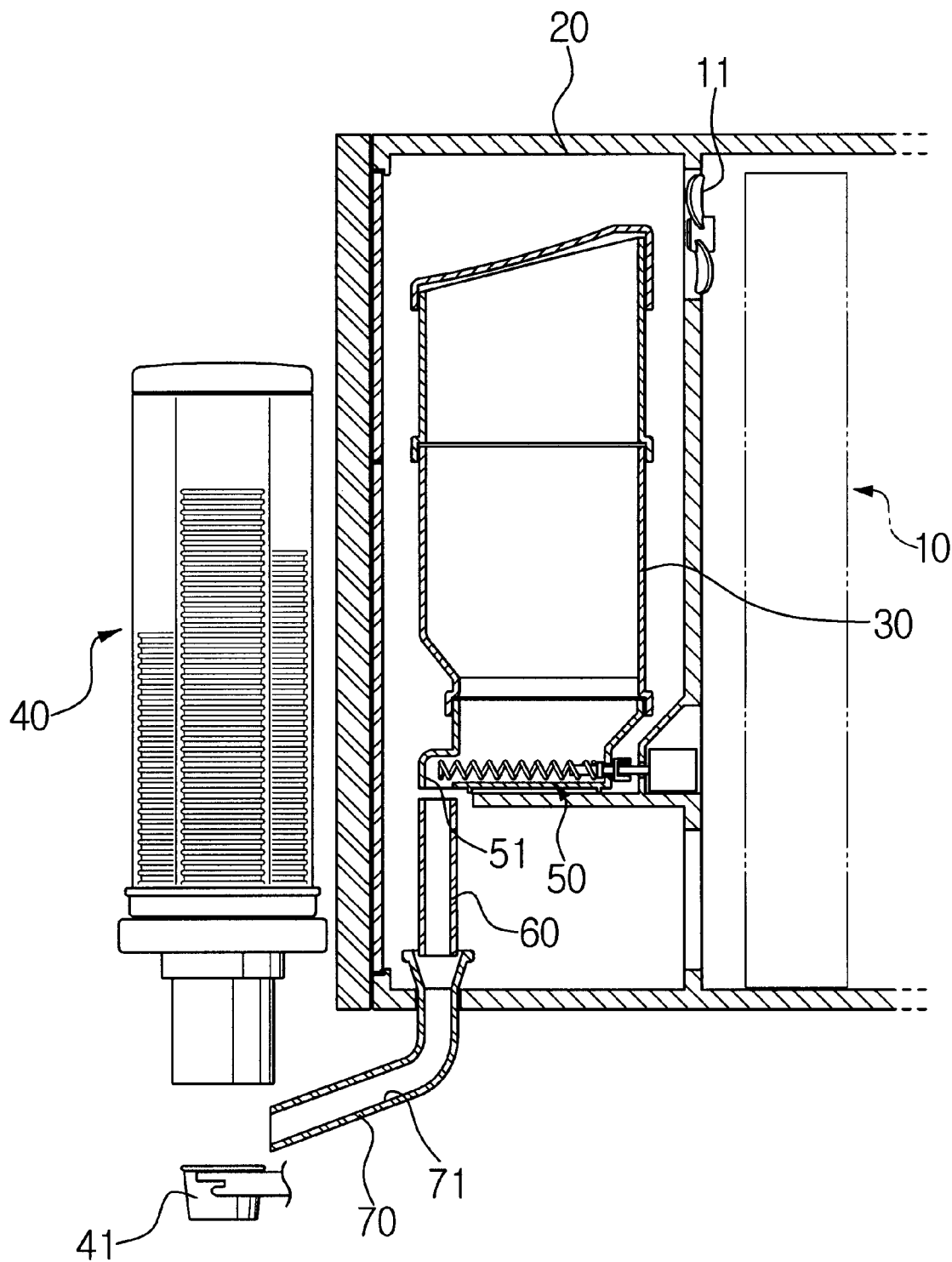
FIG. 1 is a partial sectional view showing a conventional ice cream vending machine.
Figure 2:
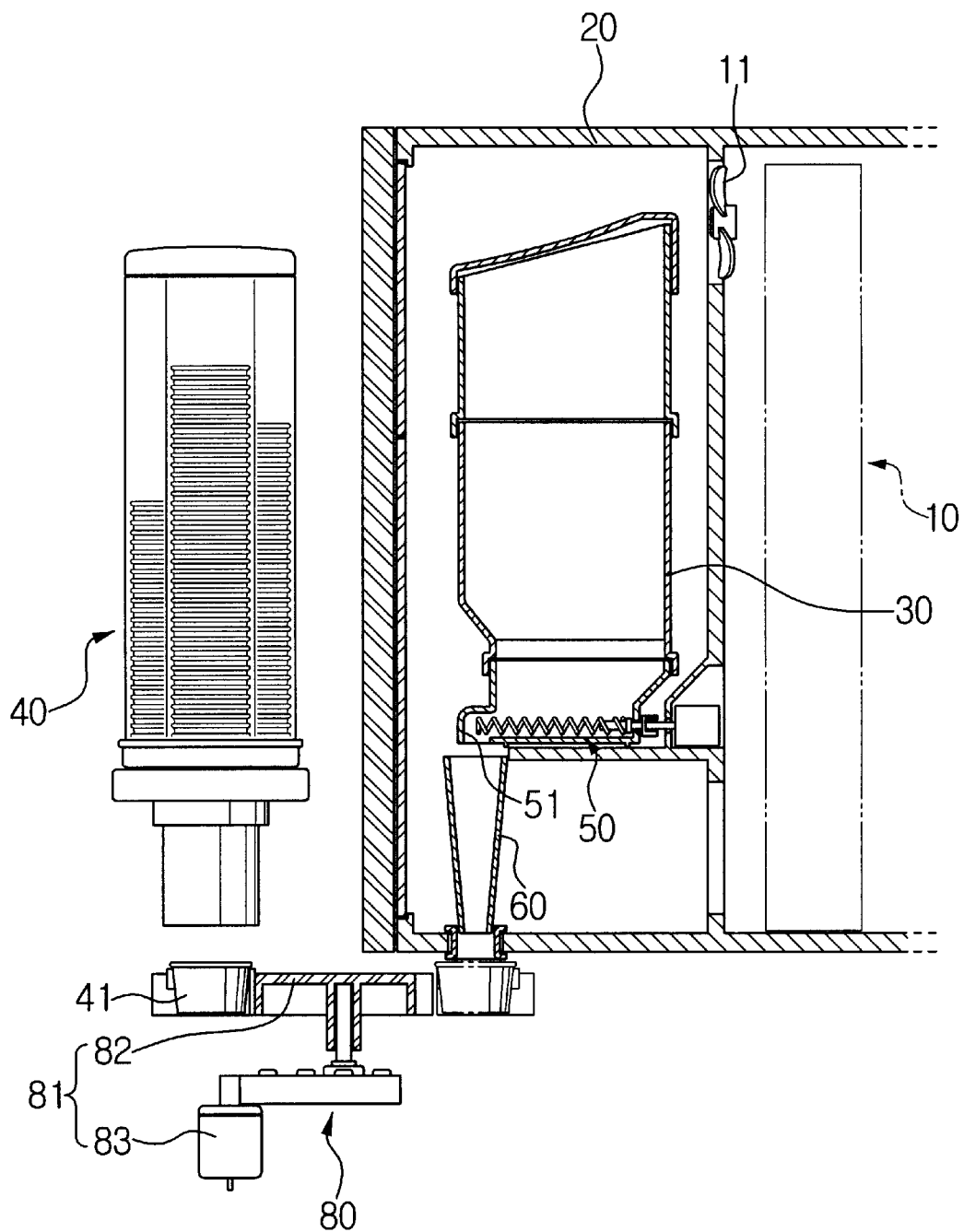
FIG. 2 is a partial sectional view showing an ice cream vending machine in accordance with the first preferred embodiment of the present invention.

FIG. 2 shows an ice cream vending machine in accordance with the first preferred embodiment of the present invention. Where the elements are similar or identical to the conventional ice cream vending machine shown in FIG. 1, identical reference numerals will be used. The vending machine includes a cooling system 10, a freezing chamber 20, a canister 30, a cup supplying device 40, and an ice cream discharging device 50.

The cooling system 10 is substantially identical to a general cyclical refrigerator. Once cooled by the cooling system 10, the air is blown into the freezing chamber 20 by a blower 11. The canister 30 is arranged in the freezing chamber 20.

The canister 30 is filled with a bead type ice cream, that is, frozen into granular shape and having a diameter of between 3–7mm. In order to maintain the bead shape of the ice cream, the freezing chamber 20 is maintained at temperatures ranging from −43° C. to −27° C.

The cup-supplying device is arranged outside of the freezing chamber 20 to supply a cup 41 for holding the ice cream. The ice cream discharging device 50 is provided on the lower portion of the canister 30. The cup supplying device 40 and the ice cream discharging device 50 are generally identical to those of a conventional ice cream dispenser.

Underneath the discharging port 51 of the ice cream discharging device 50, a chute 60 is arranged to collect the discharge ice cream into a predetermined path. The chute 60 may be constructed in the shape of a truncated cone, as shown. Regardless of the location of the canister 30, the ice cream can be discharged outside of the freezing chamber 20 from the same location.

Figure 3:
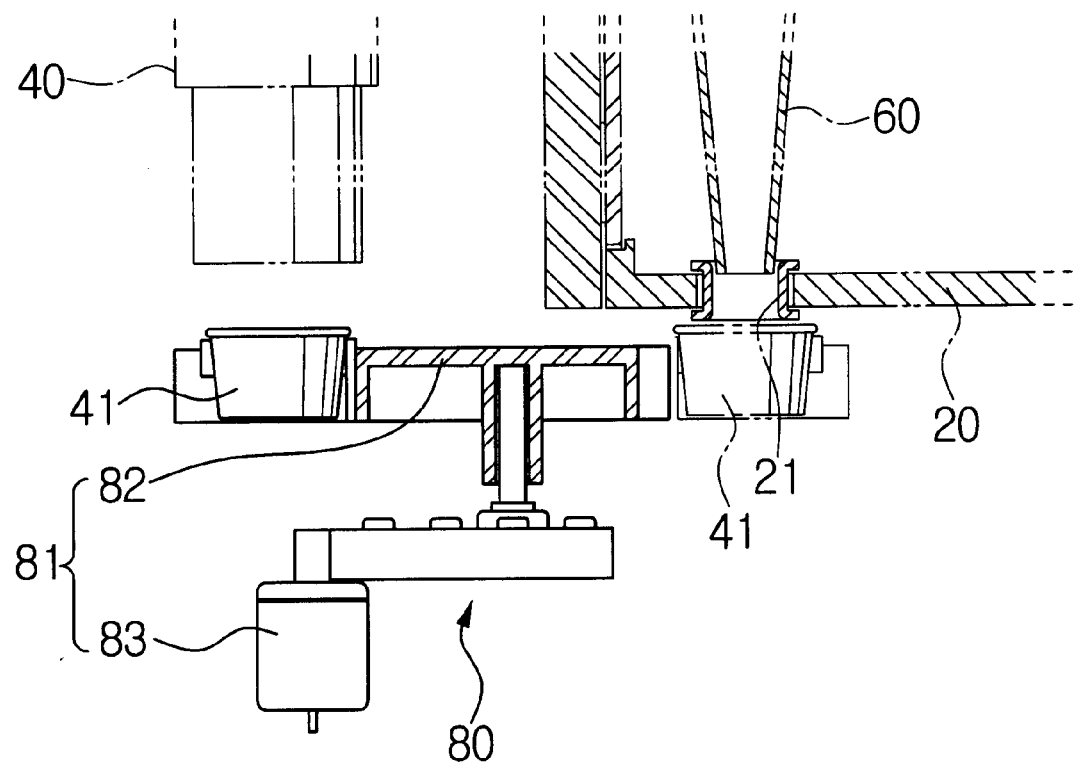
FIG. 3 is a partial sectional detail view of the cup conveying means of the ice cream vending machine shown in FIG. 2.

A cup conveying means 80 is provided between the location (hereinafter called 'first location') where the cup 41 is supplied by the cup-supplying device 40 and the location (hereinafter called 'third location') where the ice cream is discharged. FIG. 3 shows the cup-conveying means 80 in greater detail.

Referring to FIG. 3, the cup conveying means 80 includes a horizontal conveying unit 81, which includes a cup holder 82 and a motor 83 for rotating the cup holder 82. When the motor 83 is driven, the cup holder 82 is rotated between the first and third positions.

As for the conveying unit 81, various methods are already known in the various fields. Accordingly, it should be understood that the horizontal conveying unit 81 of FIG. 3 is only illustrated and designed as an example, and other methods such as conveying by a linear actuator, or a rotary conveyor, or the like, can also be used. In the ice cream vending machine in accordance with the first preferred embodiment of the present invention, when the customer inputs the required coins, of a predetermined amount, in the vending machine and presses the selection button, the cup 41 is supplied to the cup holder 82 at the first location by the cup-supplying device 40 (shown in phantom). Next, the motor 83, an actuator for the horizontal conveying unit 81, is driven, and as a result, the cup 41 is conveyed from the first to the third location. Then, the ice cream discharging device 50 (FIG. 2) is driven, and the bead type ice cream is discharged through the discharging port 51.

The discharged ice cream is guided to the cup 41 (FIG. 3) through the chute 60 and through an ice cream outlet 21. Then, the motor 83 is driven, and the cup 41 is conveyed from the third to the first location. The customer takes out the cup 41 and enjoys the ice cream. Accordingly, in the ice cream vending machine in accordance with the first preferred embodiment of the present invention, since the cup 41 is conveyed between the first and third locations by the cup conveying means 80, the ice cream can be supplied into the cup 41 directly from the freezing chamber 20. Accordingly, unlike the conventional vending machine, there is no possibility that the ice cream is supplied at a non-frozen temperature, and the ice cream can be served to the customer in an optimum state, while the maintenance of the ice cream vending machine becomes more convenient.

Figure 4:
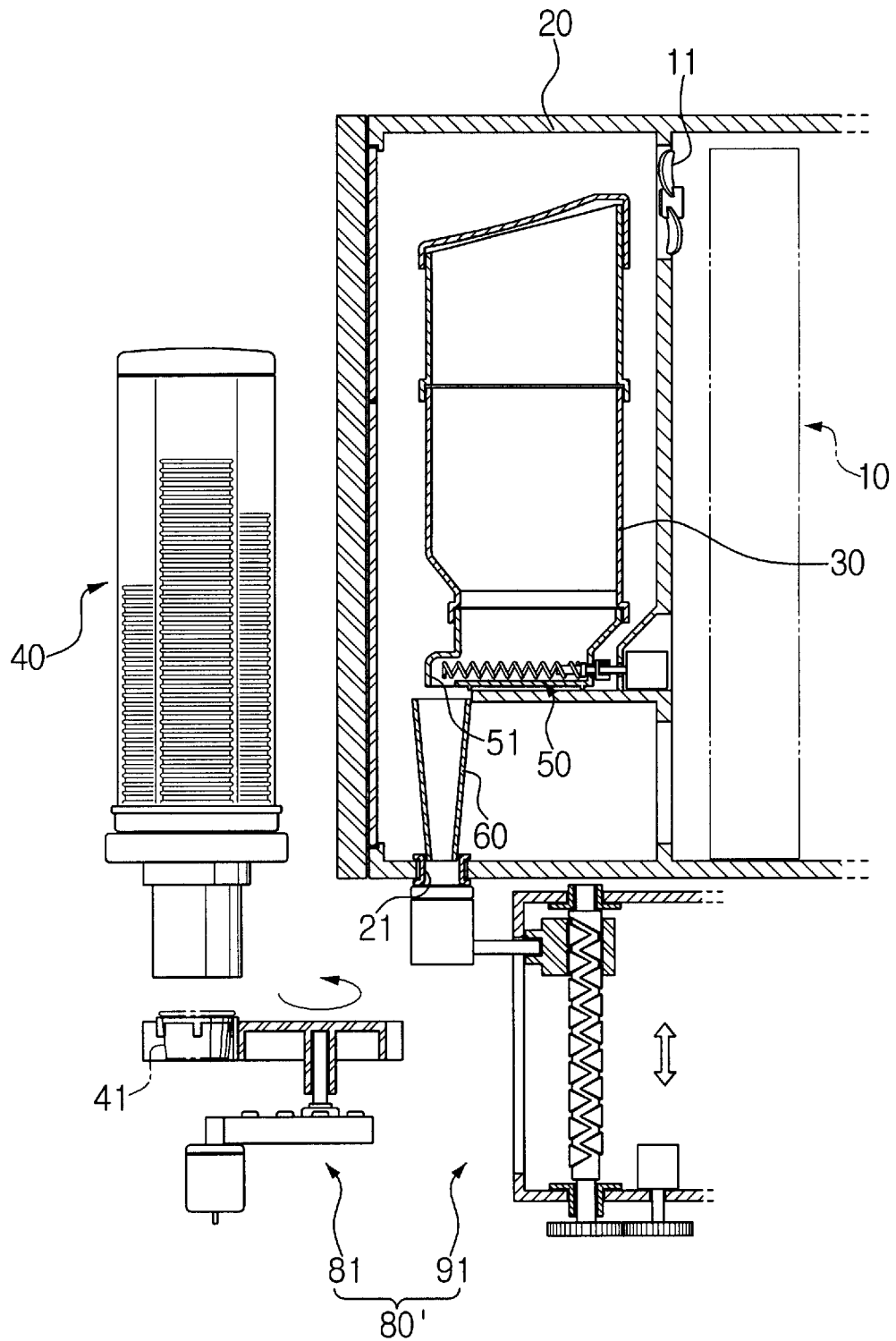
FIG. 4 is a partial sectional view showing an ice cream vending machine in accordance with the second preferred embodiment of the present invention.

FIG. 4 shows the ice cream vending machine in accordance with a second preferred embodiment of the present invention. According to the second embodiment, unlike the first embodiment, the first and the third locations are not on the same plane. Except for the above-mentioned difference, the second preferred embodiment is almost identical to the first preferred embodiment. More specifically, except for the cup conveying means 80', the elements of the second preferred embodiments are substantially identical to the same of the first preferred embodiment. Accordingly, like elements will be given the same reference numerals and any redundant description will be omitted as much as possible.

Figure 5:
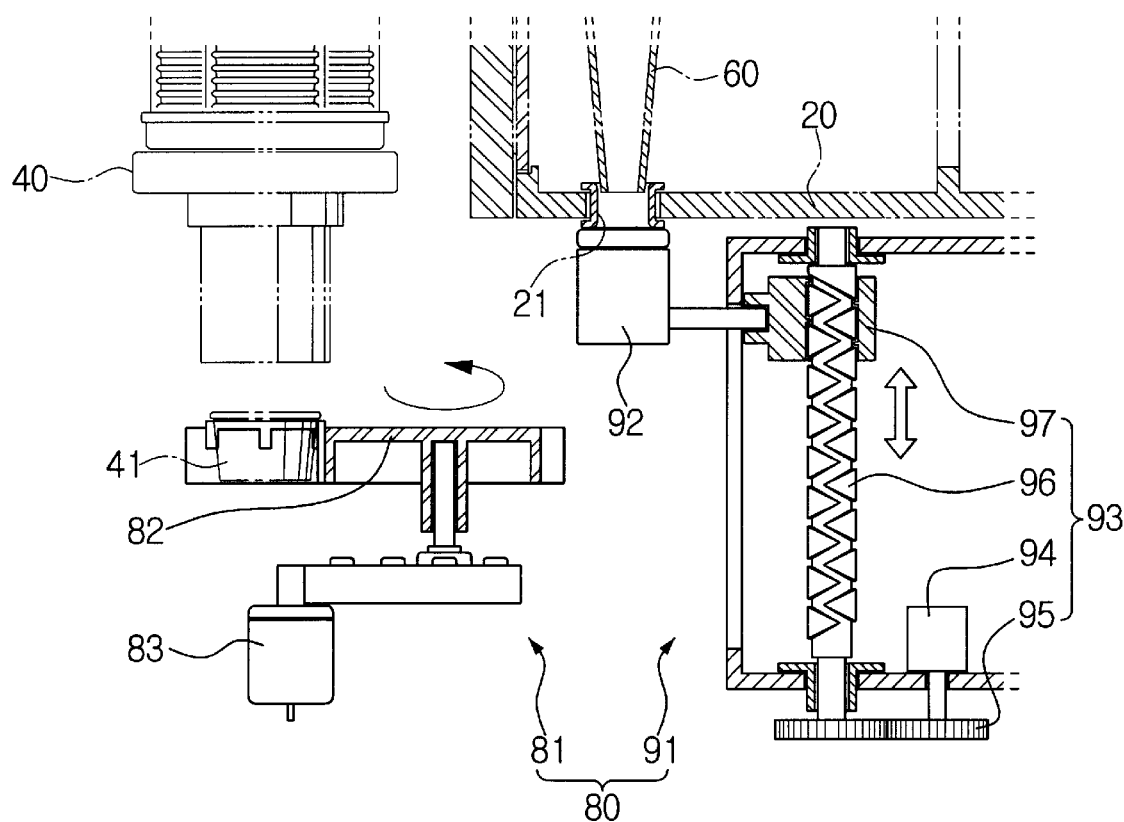
FIG. 5 is a partial sectional detail view of the cup conveying means of the ice cream vending machine shown in FIG. 4.

Referring to FIG. 5, the cup-conveying means 80' of the second preferred embodiment is shown in greater detail and includes a horizontal conveying unit 81 and a vertical conveying unit 91. The horizontal conveying unit 81 includes a cup holder 82 and a motor 83 for rotating the cup holder 82, and horizontally conveys the cup 41 from the first location to a location (hereinafter called 'second location') that is in perpendicular relation with an imaginary line between the first and the third locations, as will be described below.

The vertical conveying unit 91 includes a cup-supporting member 92 and a supporting member conveying means 93 for vertically conveying the cup-supporting member 92. The vertical conveying unit 91 vertically conveys the cup 41 between the second and the third locations.

In the second preferred embodiment, the supporting member conveying means 93 includes a motor 94, a gear 95, a cam shaft 96, and a cam nut 97. A rotary shaft of the motor 94 is connected to the cam shaft 96 via a driving force transmission means, such as gear 95.

The cup-supporting member 92 is attached to a side of the cam nut 97, and accordingly, the cam nut 97 is rotated together with the cam shaft 96 when the cam shaft 96 is rotated. Accordingly, when the motor 94 is driven, the cup-supporting member 92 is conveyed upward and downward, depending on the stage of operation.

Meanwhile, although the supporting member conveying means 93 includes the cam shaft 96 and the cam nut 97 in the second preferred embodiment, it is not so strictly limited. Accordingly, the supporting member conveying means 93 may include other forms or elements, such as a screw and nut combination (not shown).

Figure 6A:
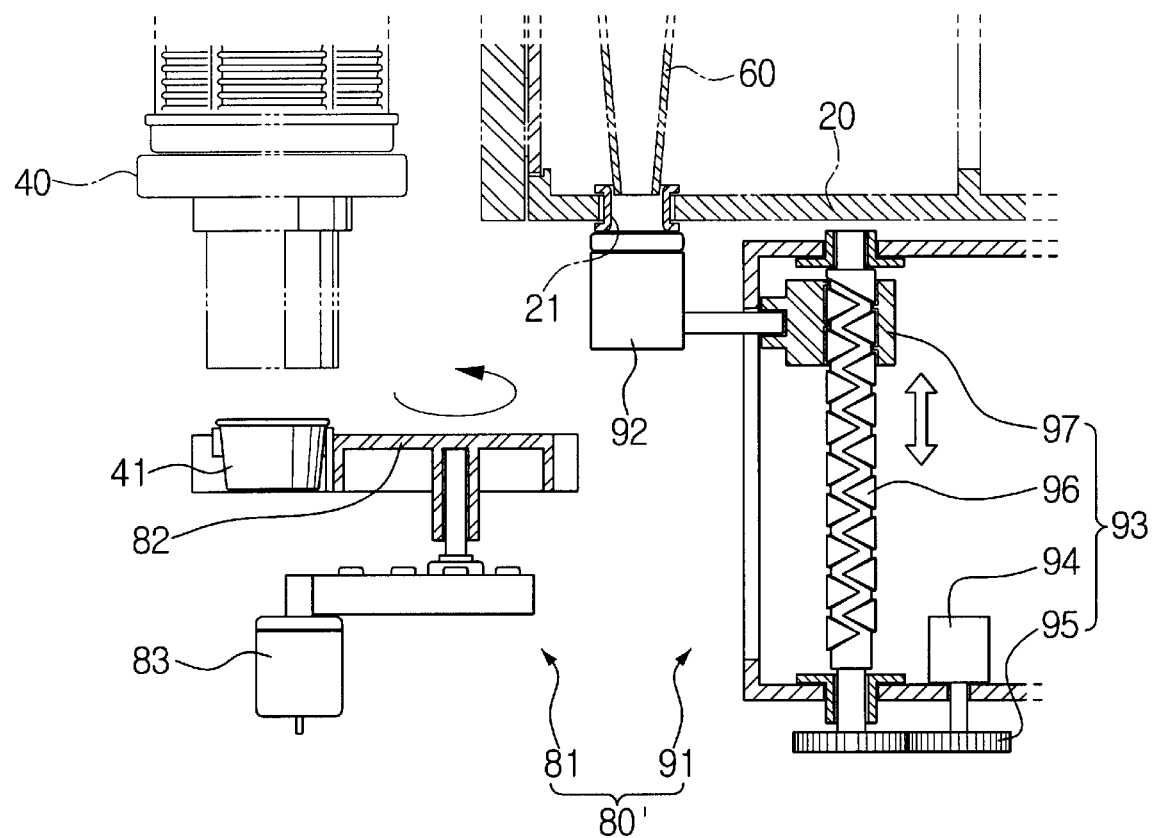
FIGS. 6A through 6F are partial sectional detail views showing the operations of the cup conveying means of the ice cream vending machine of FIG. 4.
Figure 6B:
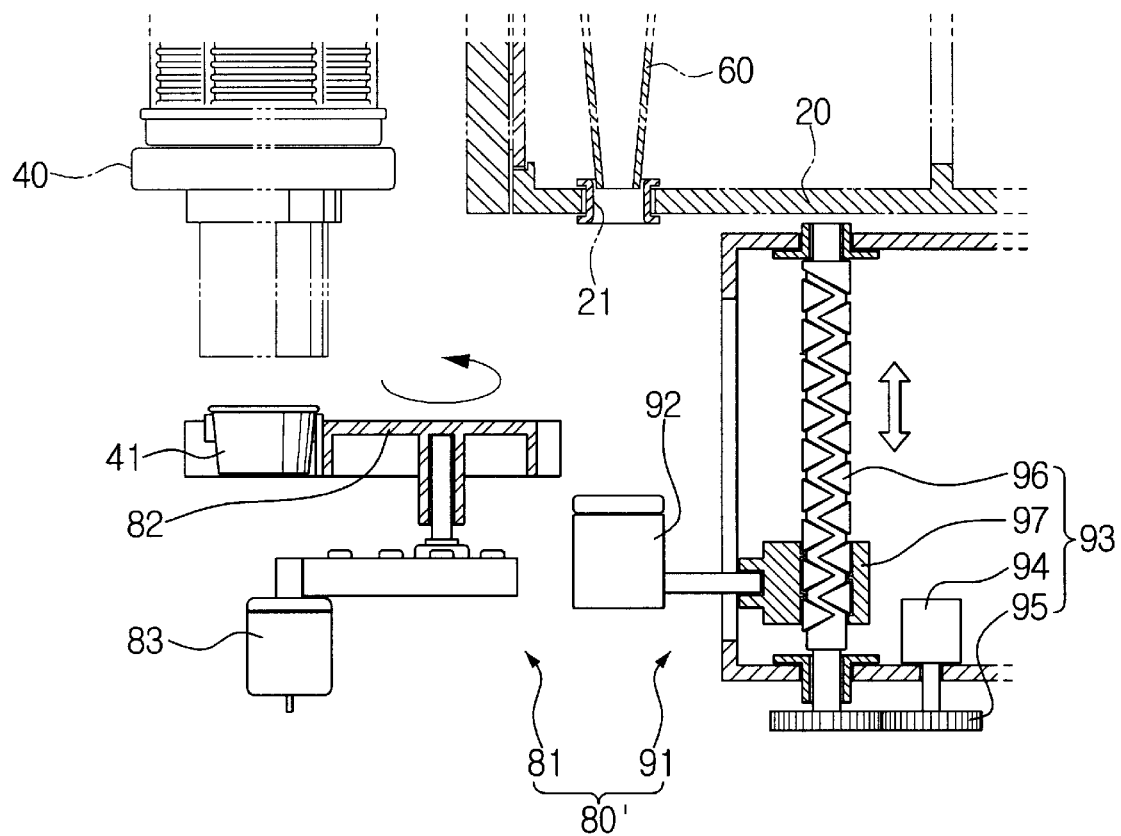
Figure 6C:
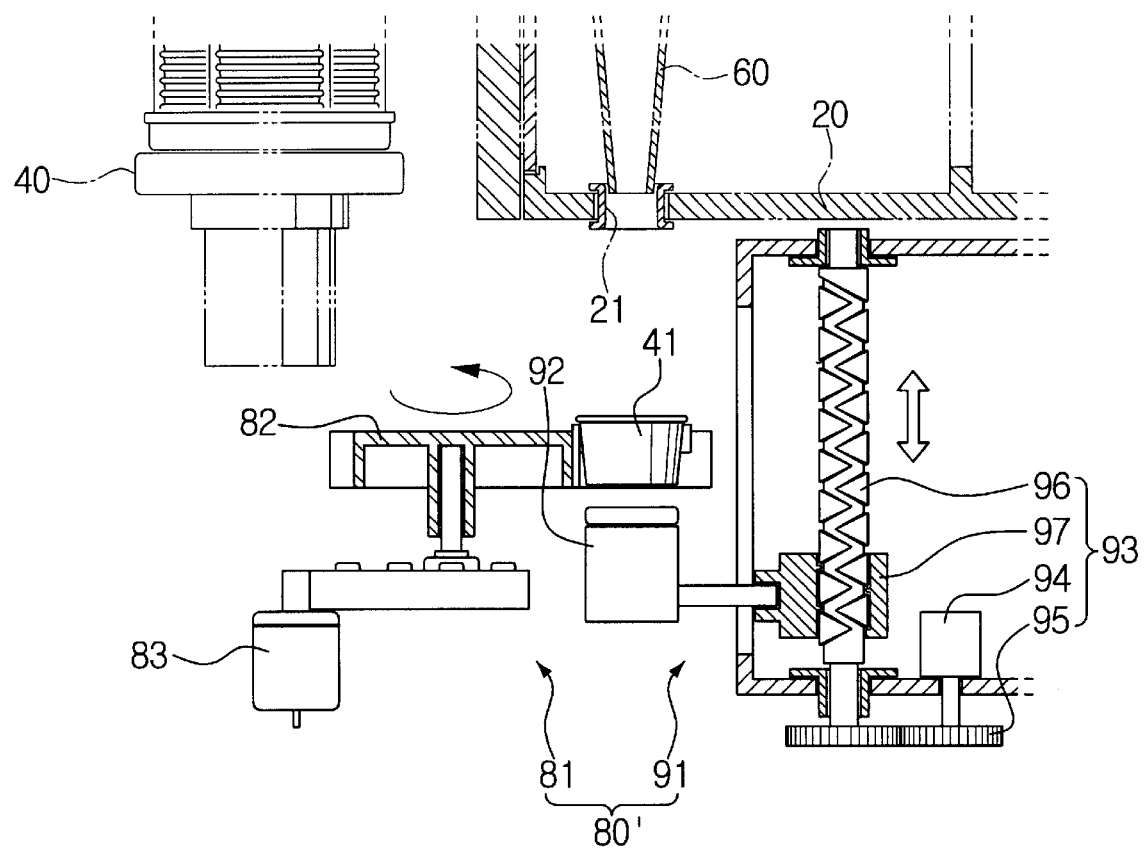

During operation of the ice cream vending machine in accordance with the second preferred embodiment of the present invention, when the customer inputs coins of a predetermined amount into the vending machine, and then presses the selection button, the cup 41 is supplied to the cup holder 82 at the first location by the cup supplying device 40, as shown in FIG. 6A. Continuously, the motor 94 is driven, and the cup supporting member 92, which covers the ice cream outlet 21 of the freezing chamber 20, is moved downward, opening the ice cream outlet 21 of the freezing chamber 20, as shown in FIG. 6B. Then, the motor 83 is driven, and the cup 41 is conveyed to the second location, as shown in FIG. 6C.

Figure 6D:
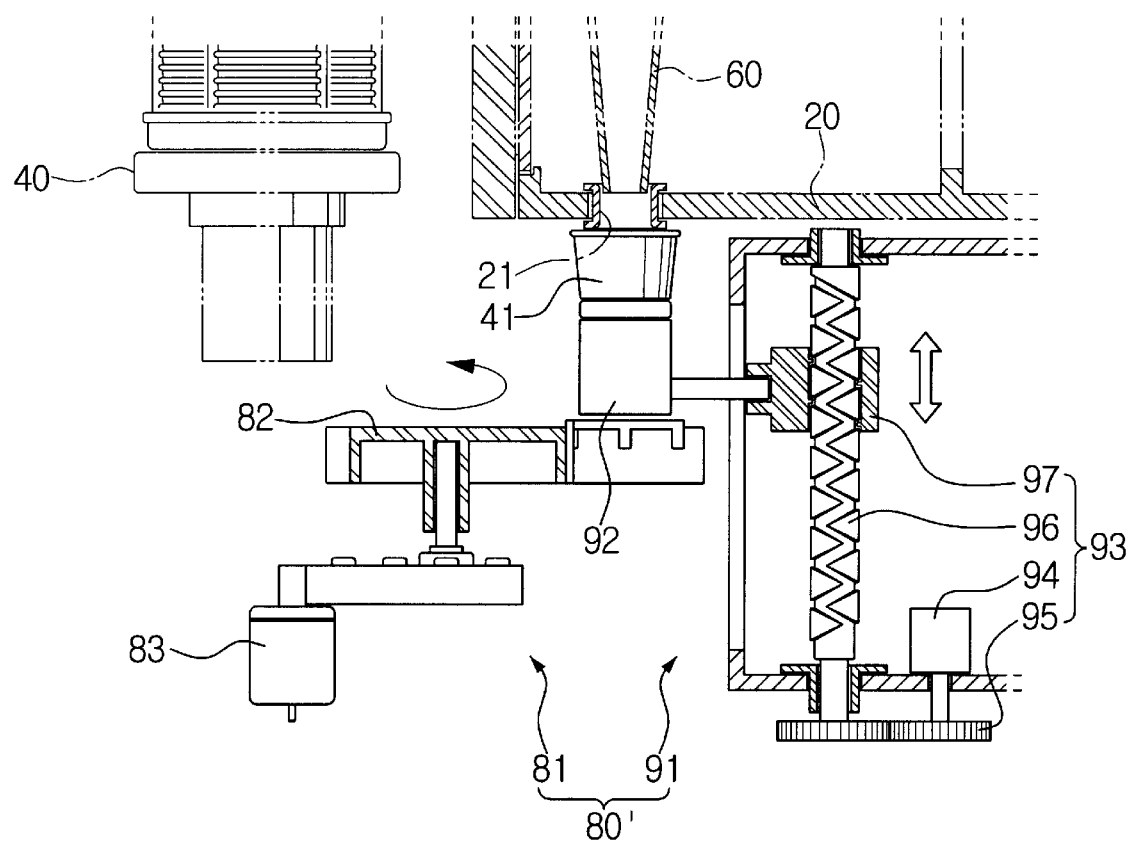

Continuously, the motor 94 is driven, the cup 41 is conveyed to the third location by the cup-supporting member 92, as shown in FIG. 6D, and after that, the ice cream discharging device 50 (FIG. 2) is operated, discharging the bead type ice cream through the discharging port 51 and into the chute 60.

Figure 6E:
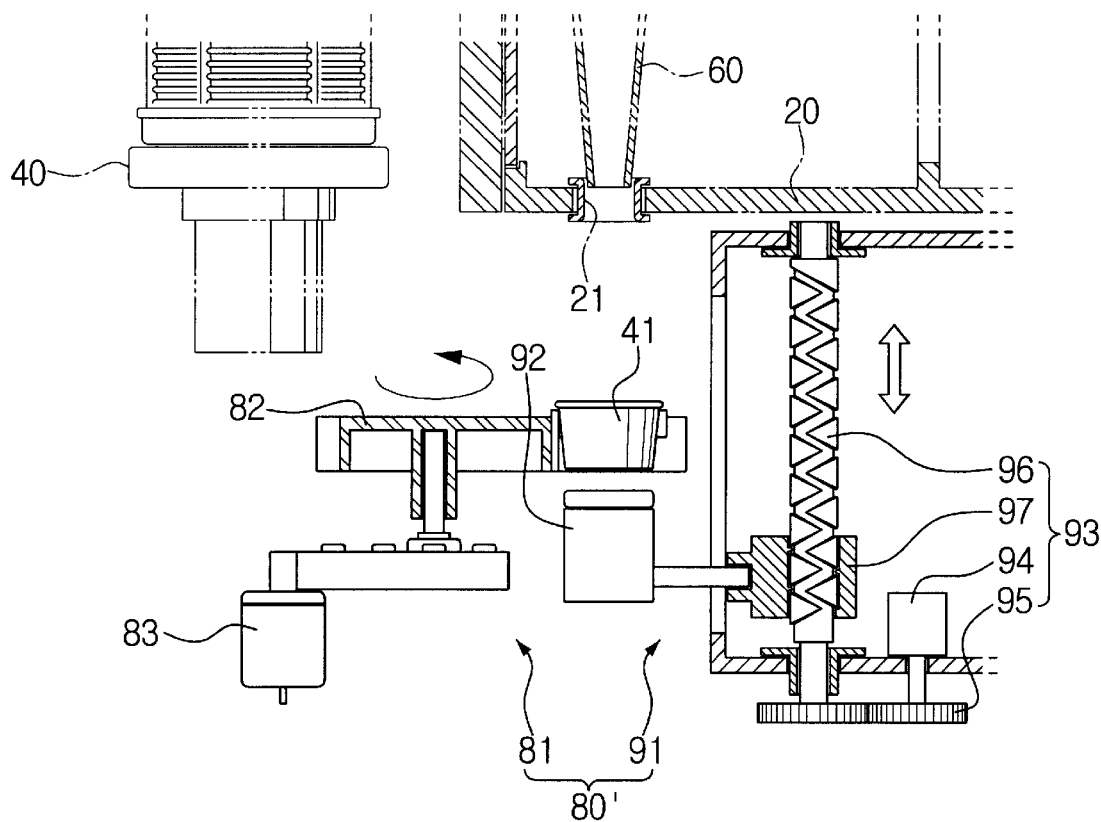

The discharged ice cream is guided into the cup 41 through the chute 60 and through the ice cream outlet 21. After discharge of the ice cream, the motor 94 is driven to convey the cup 41 from the third location to the second location and position the cup 41 in the cup holder 82, as shown in FIG. 6E.

Figure 6F:
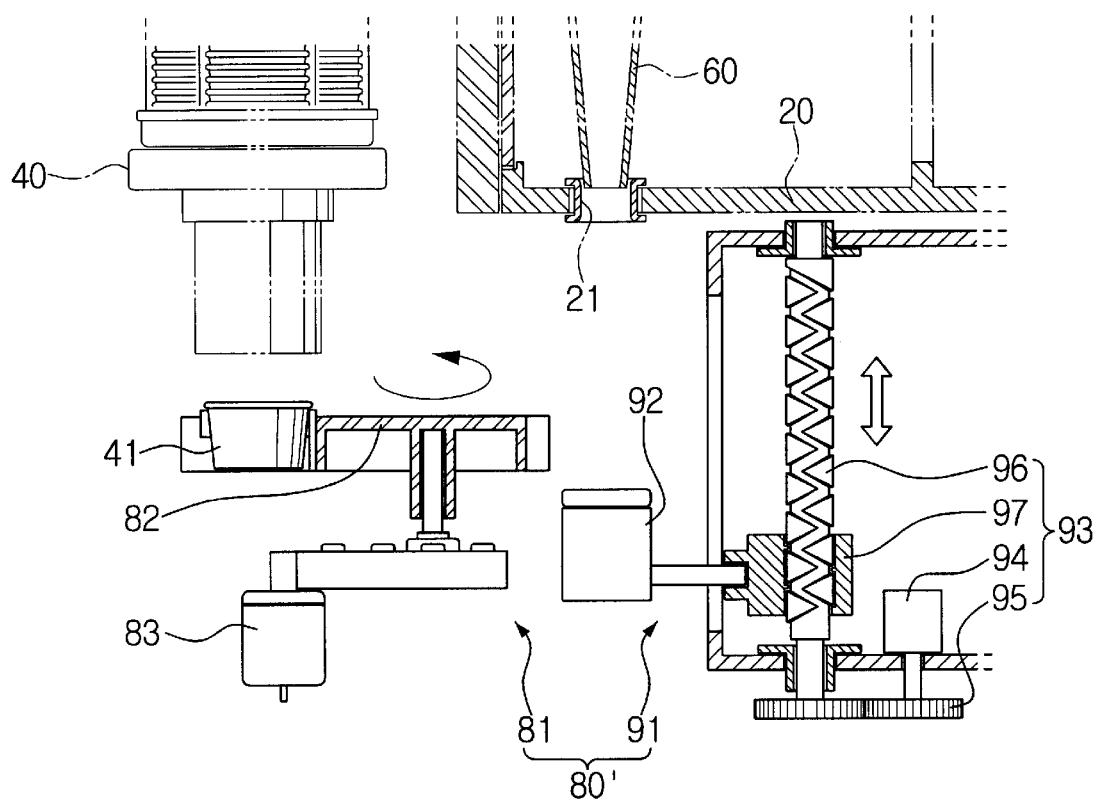

Next, the motor 83 is driven, and the cup 41 is conveyed to the first location, as shown in FIG. 6F. Then the motor 94 is driven, and the ice cream outlet 21 of the freezing chamber 20 is closed by the cup-supporting member 92, as shown in FIG. 6A. Then, the customer takes the cup 41 out, and enjoys the ice cream.

Accordingly, the ice cream vending machine in accordance with the second preferred embodiment of the present invention provides the ice cream in desirable form, since the cup 41 is conveyed between the first and the third locations by the cup conveying means 80', and the ice cream can be supplied into the cup 41 directly from the freezing chamber 20.

Accordingly, unlike the conventional ice cream vending machine in which the ice cream is supplied at greater than ideal temperature, the vending machine in accordance with the present invention serves the customer with fresh ice cream. Also, the maintenance of the vending machine becomes much easier and less messy for the machine operator.

Meanwhile, according to the second preferred embodiment of the present invention, while the cup conveying means 80' conveys the cup 41, the cup-supporting member 92 of the vertical conveying unit 91 opens and closes the ice cream outlet 21 of the freezing chamber 20. Accordingly, when the vending machine is not in vending operation, the ice cream outlet 21 of the freezing chamber 20 is closed, thereby preventing a loss of cool air and unnecessary consumption of electricity for maintaining an appropriate temperature in the freezing chamber 20.

Figure 7:
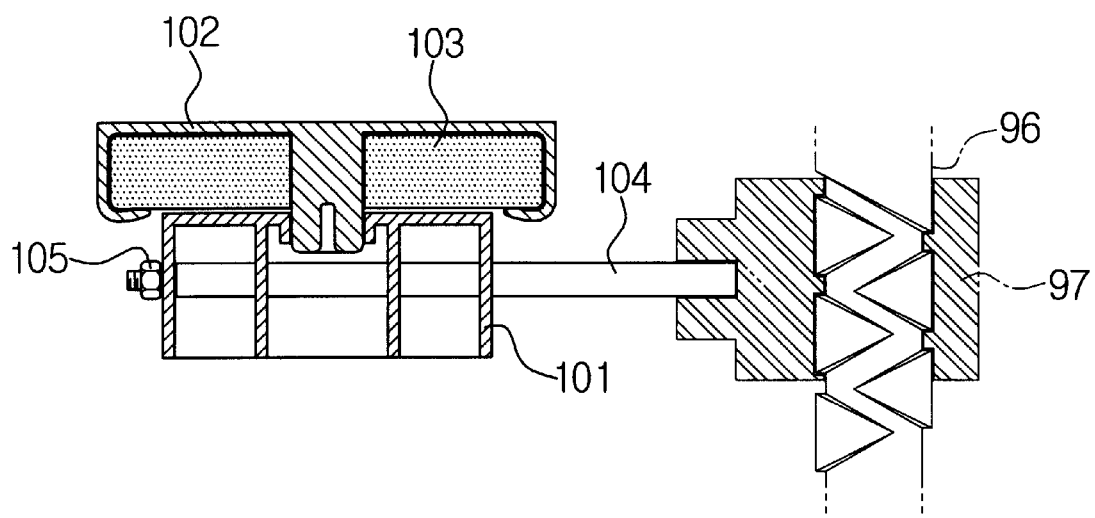
FIG. 7 is a sectional view for explaining the construction of the cup-supporting member of the cup conveying means of the ice cream vending machine of FIG. 4.

For this, it is preferable that the cup-supporting member 92 is formed of materials having an ability to closely engage the adjacent members and good thermal insulation. Accordingly, in the preferred embodiments of the present invention, the cup-supporting member 92 includes a supporting member body 101, a cup-mounting member 102, and a thermal insulating member 103, as shown in FIG. 7.

The supporting member body 102 is fastened to the cam nut 97 by a pair of rods 104 and a pair of nuts 105. The cup-mounting member 102 is arranged on the upper side of the supporting member body 101, and the thermal insulating member 103 is arranged on the lower side of the cup-mounting member 102.

It is also preferable that the cup-mounting member 102 and the thermal insulating member 103 are made of a material having appropriate elasticity in order to ensure good close contact, preferably a sealing contact, when the ice cream outlet 21 of the freezing chamber 20 is closed by the cup supporting member 92. In the second preferred embodiment of the present invention, the cup-mounting member 102 is made of a silicon material, and the thermal insulating member 103 is made of polyurethane foam.

Since the cup 41 is conveyed between the first and the third locations by the cup conveying means, either 80 or 80', the ice cream can be dispensed directly into the cup 41 from the freezing chamber 20.

Accordingly, unlike the conventional ice cream vending machine in which the ice cream is supplied at a greater temperature than that of the freezing chamber 20, the vending machine in accordance with the present invention always serves the customer with fresh ice cream in an optimum state. Also, the machine operator can maintain the vending machine more easily.

Although the preferred embodiments of the present invention have been described, it will be understood by those skilled in the art that the present invention should not be limited to the described preferred embodiments, but that various changes and modifications can be made within the spirit and scope of the present invention which is only to be limited and defined by the appended claims and equivalents thereof.

What is claimed is:

1. An ice cream vending machine, comprising:
    a cooling system;
    a freezing chamber cooled by the cooling system;
    a canister arranged within the freezing chamber, for holding a bead type ice cream;
    a cup supplying device arranged outside of the freezing chamber, for supplying a cup for holding the bead type ice cream;
    an ice cream discharging device for discharging the bead type ice cream from the canister; and
    a conveying means for conveying the cup supplied by the cup supplying device, the cup being conveyed between a first location, wherein the cup is supplied by the cup supporting device, to a third location, wherein the ice cream is discharged from the freezing chamber.

2. The vending machine of claim 1, wherein the first and the third locations are on one and the same horizontal planes, respectively, and the cup conveying means comprises a horizontal conveying unit for conveying the cup supplied by the cup supplying device between the first and the third locations.

3. The vending machine of claim 1, wherein the first and the third locations are on different horizontal planes, respectively, and the cup conveying means comprises a horizontal conveying unit for horizontally conveying the cup from the first location to a second location in perpendicular relation with an imaginary line between the first and the third locations, and a vertical conveying unit for vertically conveying the cup between the second and the third locations.

4. The vending machine of claim 3, wherein the vertical conveying unit comprises a supporting member conveying means for vertically conveying the cup supporting member and the cup supporting member, and the cup supporting member serves a function of supporting the cup during vertical conveyance of the cup, and also serves a function of closing an ice cream outlet of the freezing chamber when the vending machine is not in vending operation.

* * * * *